United States Patent
Hiraishi et al.

(10) Patent No.: US 6,211,929 B1
(45) Date of Patent: Apr. 3, 2001

(54) SURFACE LIGHT SOURCE DEVICE OF SIDE LIGHT TYPE AND LIQUID CRYSTAL DISPLAY

(75) Inventors: Fuminori Hiraishi, Urawa; Shingo Ohkawa, Koshigaya, both of (JP)

(73) Assignees: Enplas Corporation, Kawaguchi; Yasuhiro Koike, Yokohama, both of (JP)

( * ) Notice: Subject to any disclaimer, the term of this patent is extended or adjusted under 35 U.S.C. 154(b) by 0 days.

(21) Appl. No.: 09/379,590

(22) Filed: Aug. 24, 1999

(30) Foreign Application Priority Data

Aug. 31, 1998 (JP) .................................................. 10-244480

(51) Int. Cl.$^7$ .................................................. G02F 1/1335
(52) U.S. Cl. .................................................. 349/65; 349/62
(58) Field of Search .................................... 349/65, 62, 61

(56) References Cited

U.S. PATENT DOCUMENTS

| | | | |
|---|---|---|---|
| 5,886,759 | * 3/1999 | Maskino et al. | 349/65 |
| 5,899,552 | * 5/1999 | Yokoyama et al. | 362/31 |
| 5,914,759 | * 6/1999 | Higuchi et al. | 349/57 |
| 5,957,561 | * 9/1999 | Ono et al. | 362/31 |
| 5,966,192 | * 10/1999 | Higuchi et al. | 349/61 |
| 5,982,540 | * 11/1999 | Koike et al. | 359/487 |
| 5,997,148 | * 10/1999 | Ohkawa | 362/31 |
| 5,999,685 | * 12/1999 | Goto et al. | 385/146 |
| 6,011,602 | * 1/2000 | Miyashita et al. | 349/65 |

* cited by examiner

*Primary Examiner*—Kenneth Parker
(74) *Attorney, Agent, or Firm*—Staas & Halsey LLP

(57) ABSTRACT

A liquid crystal display includes a LCD panel and a surface light source device of side light type to illuminate the panel. The surface light source device comprises a guide plate having an emission face, a back face and an incidence face, a primary light source to supply light through the incidence face, and a reflection member disposed along the back face. The reflection member has an inner reflection face including a plurality of fine regions to control angular extension of illumination output. The fine regions are provided with scattering property which is different from that of the rest region. In cases where emission promoting power (scattering power) of the emission face falls according to distance from the incidence face, the reflection face of the reflection member is provided with scattering power which varies so as to tend to compensate said falling of emission promoting power. Fine regions are arranged in corner portions located at both ends of the incidence face to avoid short of emission. Employment of a reflection member provided with fine regions controls angular extension of illumination output, thereby preventing bright-dark unevenness from appearing under ranging view-angles.

10 Claims, 11 Drawing Sheets

SURFACE LIGHT SOURCE DEVICE OF SIDE LIGHT TYPE AND LIQUID CRYSTAL DISPLAY

BACKGROUND

1. Field of Invention

The present invention relates to a surface light source device of side light type and a liquid crystal display, in particular, to the devices capable of providing illumination such that an improved quality is obtained as to viewing directions deviated from the frontal direction (principal illumination output direction, in general) by a small angle.

2. Related Art

It is well known to illuminate a liquid crystal display panel of a liquid crystal display by means of a surface light source device of side light type. In general, the surface light source device of side light type comprises a guide plate and a primary light source such as a rod-shaped light source which is arranged along an incidence face provided by an end face of the guide plate. Such arrangement has an advantage that prevents overall thickness of the device from increasing when the surface light source device is applied to a liquid crystal display.

Primary light emitted from the primary light source is introduced into the guide plate through the incidence face. As known well, the guide plate deflects the introduced light through processes such as scattering and reflection, thereby causing emission from an emission ace provided by a major face of the guide plate. Thus emitted light is supplied to the liquid crystal display panel through a light control member such as a prism sheet and/or an other additional member.

Another major face provides a back face opposite with the emission face. A reflection member is disposed along the back face so as to reflect and return light leaked through the back face into the guide plate, thereby checking illumination energy loss. The reflection member has an inner face opposing to the back face, the inner face being provided with regular or irregular reflectivity. Employable materials such as metal foil or white PET film are known.

Two types of guide plates are known. Guide plates of one type have thickness substantially uniform overall, respectively. Guide plates of the other type have thickness tending to reduce with increasing distance from incidence faces, respectively. In general, the latter are capable of emitting illumination light more effectively in comparison with the former.

A known guide plate has an emission face which provides a light control face. The light control face promotes emission from the emission face. Brightness distribution is controllable through promotion power different depending on locations in the emission face. The light control face is provided, for example, by forming a light scattering pattern on the emission face. A typical scattering pattern consists of a great number of light scattering elements arranged according to a designed arrangement rule. These light scattering elements are provided by a great number of local rough regions formed by application of methods such as matting or ink deposition.

As well known, light emission from an emission face of a guide plate preferentially occurs forward obliquely (that is, so as to distance an incidence face). Such property is called "emission directivity".

A prism sheet is disposed along the emission face as a typical light control member for the purpose of correcting this directivity. A prism sheet is an optical member at least one face of which provides a prism face, being made of a light permeable material such as polycarbonate or polyethylene terephthalate.

As known well, emission light is subject to refraction and inner reflection which are caused by the prism face(s) of the prism sheet disposed as above, with the result that an oblique preferential emission direction (principal propagation direction) is corrected to around a frontal direction with respect to the emission face.

Such conventional techniques have been applied to various illumination devices and displays such as liquid crystal display because the techniques are able to provide illumination output with high quality directed to a certain direction, typically directed to a frontal direction. However, such prior arts have an unsolved problem that directions deviated by small angles from the frontal direction are subject to reduction in quality of illumination output.

In other words, when an emission face is observed from directions deviated somewhat from the frontal direction, bright-dark unevenness is seen on the emission face. Such bright-dark unevenness will appear strikingly in particular if the emission face provides a light control face provided with a light scattering pattern consisting of a great number of local light scattering regions.

This is supposed to be caused by difference in scattering power, brought by the light scattering pattern, depending on locations on the emission face. Emission with a relatively large angular extension occurs in areas containing local light scattering regions with high density while emission occurs in a relatively small large angular extension in areas containing local light scattering regions with low density.

As a result, difference in degree of directivity depending on locations is produced. That is, in some areas, a small angle deviation from the frontal direction gives a much different emission intensity compared with that of the frontal direction, while in other areas, it gives a less different emission intensity compared with that of the frontal direction. This leads a phenomenon that high-brightness areas and low-brightness areas are observed when viewing position is deviated by small angles from the frontal direction.

According to experiences, when a prism sheet is arranged so that its prism face is directed to the emission face (i.e. inward arrangement of prism face), the phenomenon tends to be promoted.

Such brightness unevenness reduces illumination quality of a surface light source device of side light type. And a liquid crystal display employing the same surface light source device for illuminating a liquid crystal display panel will provide a reduced display quality.

OBJECT AND SUMMARY OF INVENTION

The present invention is proposed under the above-described background. An object of the present invention is to provide a surface light source device of side light type which has an output illumination quality improved so that bright-dark unevenness is hardly observed as to viewing directions deviated from the frontal direction by a small angle. Another object of the present invention is to provide a liquid crystal display to which the improved surface light source device of side light type is applied, the display providing a high-quality display.

The present invention is applicable to a surface light source device of side light type and a liquid crystal display employing the surface light source device for illumination a liquid crystal display panel, insofar as the surface light source device comprises:

a guide plate having an emission face, a back face and an incidence face;

a primary light source arranged to supply said guide plate with primary light through said incidence face; and a reflection member arranged along said back face so as to return light leaked from said back face into said guide plate.

According to a feature of the present invention, the reflection member has a reflection face directed to the back face, the reflection face including a plurality of fine regions to control angular extension of illumination output. The fine regions are provided with a scattering property which is different from that of the rest of the region of the reflection face. Illumination output is provided by output of the emission face of the guide plate or that of an additional sheet such as prism sheet.

This feature enables angular extension of the output light from the emission face to be controlled to suppress the aforesaid bright-dark unevenness.

If the fine regions are provided with scattering power stronger than that of the rest of the region, angular extension of the output light will be large. To the contrary, if the scattering power of the fine regions is weaker than that of the rest of the region, angular extension of the output light will be small. Angular extension of the output light is controlled through such characteristics, leading to reduction of bright-dark unevenness.

A light control member for controlling directivity of output light from the emission face may be disposed along the emission face. And the emission face may provide a light control face to promote emission. It is to be noted that these cases involve a condition that bright-dark unevenness would be particularly apt to arise without improvement according to the present invention, as described above.

And further, the back face may be provided with a great number of projections running in a direction approximately perpendicular to the incidence face to gather output light from the emission face around a frontal direction regarding in a plane parallel with the incidence face.

The light control face includes, for example, a light scattering pattern formed on the emission face. Typically, the light scattering pattern consists of a great number of light scattering elements distributed according to a designed arrangement rule. Power of emission promotion varies, for example, depending on distribution density of the light scattering elements. Accordingly, fine regions provided with scattering power greater than that of the rest region may be formed (on the reflection face) so as to correspond to regions (on the emission face) in which scattering elements are formed with relatively low density.

Alternatively and to the contrary, fine regions provided with scattering power smaller than that of the rest region may be formed (on the reflection face) so as to correspond to regions (on the emission face) in which scattering elements are formed with relatively high density.

Various techniques such as following may be employed to form fine regions on a reflection surface of a reflection member.

(1) Fine regions are formed through application of a paint to a reflection surface with irregular reflectivity, the paint being capable of reducing irregular reflection power of the reflection surface. A "rest region" is provided by the region to which the paint is not applied. In this case, the rest region has a greater scattering power than that of the fine regions. The reflection surface with irregular reflectivity may be provided by, for example, white PET (polyethylene terephthalate).

(2) Fine regions are formed through application of a light absorptive paint to a reflection surface with irregular reflectivity. A "rest region" is provided by the region to which the light absorptive paint is not applied. In this case also, the rest region has a greater scattering power than that of the fine regions. The reflection surface with irregular reflectivity may be provided by, for example, white PET (polyethylene terephthalate).

(3) Fine regions are formed through application of a paint such as white ink to a reflection surface with regular reflectivity, the paint having irregular reflectivity. A "rest region" is provided by the region to which the paint is not applied. In this case, the rest region has regular reflectivity and accordingly has a smaller scattering power than that of the fine regions. The reflection surface with regular reflectivity may be provided by, for example, a foil made of metal such as silver or aluminum.

The above-described and other features of the present invention will be understood in detail through the following further description with referring to the accompanied drawings.

BRIEF DESCRIPTION OF DRAWINGS

FIG. 1b is a diagram illustrating directional characteristics of emission varying corresponding to FIG. 1a;

EMBODIMENT

<First Embodiment>

Figure 2:
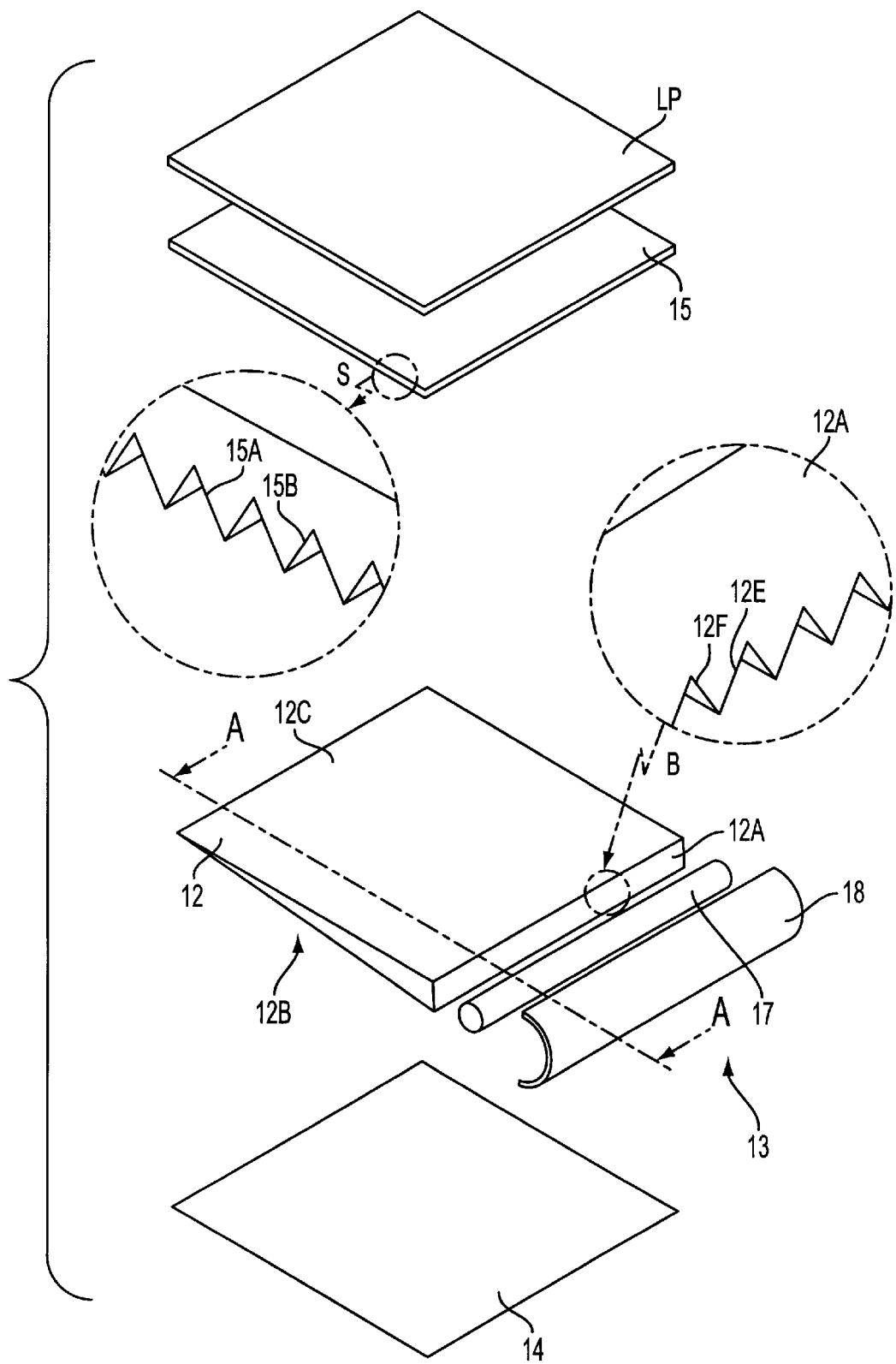
FIG. 2 is an exploded view of a liquid crystal display of the first embodiment.

Referring to FIG. 2, a surface light source device of side light type 11 is arranged behind a liquid crystal display panel LP of a LCD so that the device 11 provides illumination output to illuminate the LCD panel LP.

Figure 3:
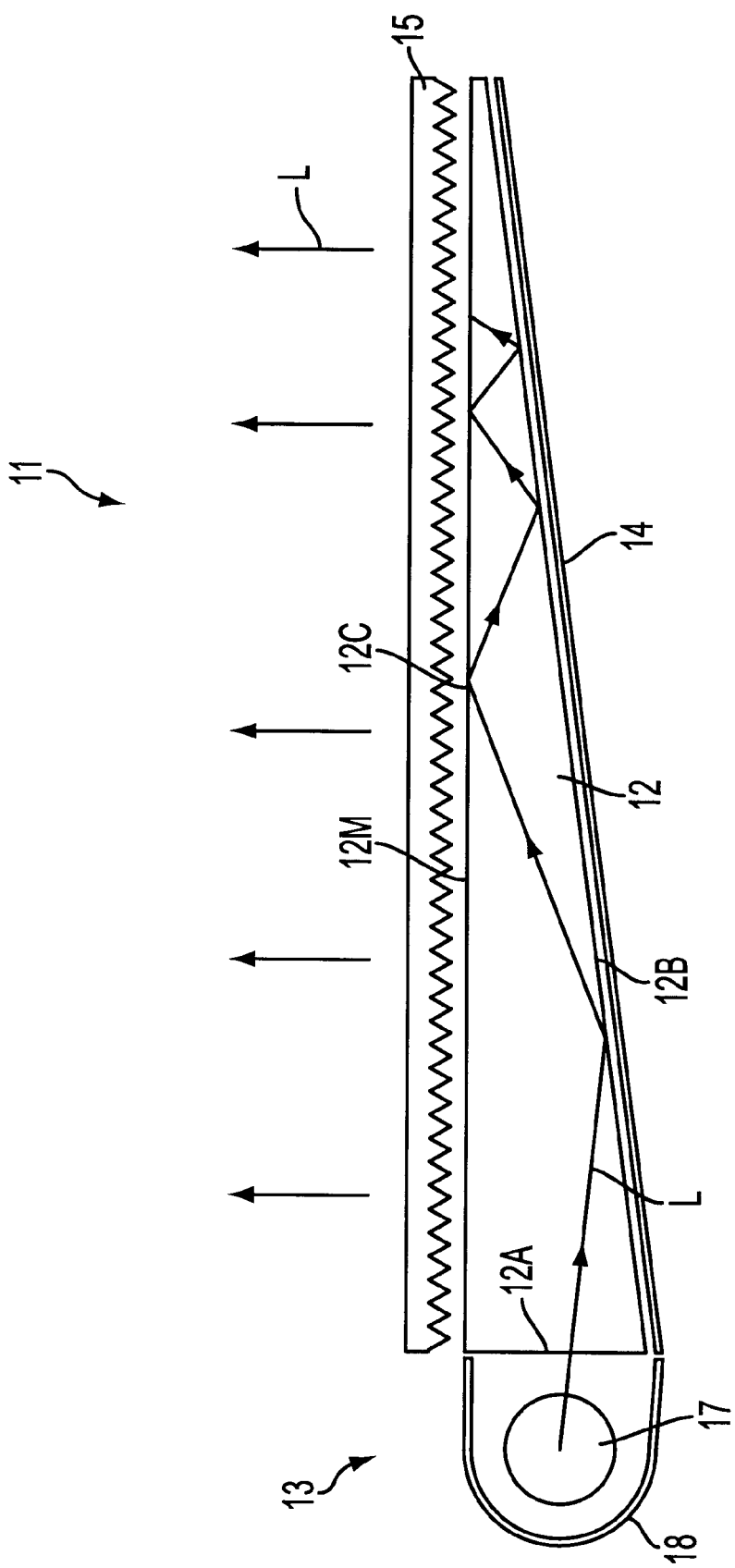
FIG. 3 is a cross section view along line A—A in FIG. 2, illustrating a cross section of the surface light source device of side light type employed in the liquid crystal display in accordance with the present invention.

As shown in FIGS. 2 and 3, the surface light source device 11 comprises a guide plate 12, a primary light source 13, reflection sheet (sheet-like reflection member) 14 and a prism sheet 15 functioning as a light control member. The reflection sheet 14, the guide plate 12 and the prism sheet 15 are laminatedly arranged in order. The guide plate 12 has a wedge-shaped cross section with a thicker end where a minor face provides an incidence face 12A beside which the primary light source 13 is disposed.

The primary light source 13 is composed of, for example, a cold cathode lamp (fluorescent lamp) 17 backed by a reflector 18. Illumination light (primary light) emitted from the fluorescent lamp 17 is supplied to the incidence face 12A of the guide plate 12 through an opening of the reflector 18. The reflector 18 is made of a sheet material with regular or irregular reflectivity.

The guide plate 12 employed in the embodiment is made of a material provided with scattering power inside. The material may have a matrix of polymethylmethacrylate (PMMA) containing light permeable "particles of different refractive index" dispersed uniformly within the matrix. The term, "particles of different refractive index" means a fine particle having a refractive index different from that of the matrix. Such material called "scattering guide material", and accordingly the guide plate 12 may be called " scattering guide plate". The reflection sheet 14 is a sheet-like member having an inner face with reflectivity.

The reflective surface is provided with a great number of fine regions according to a feature of the present invention. The reflective surface except the fine regions provides" the rest region" with reflectivity. Scattering power of "the rest region" is different from that of the fine regions as described in detail later.

Upon lighting of the fluorescent lamp 17, illumination light L is introduce into the guide plate 12 through the incidence face 12A. This illumination light L propagates so as to approach a distal wedge-end of the guide plate 12, undergoing meanwhile repeated reflections between a back face 12B and an emission face 12C. At chances of inner incidence to the back face 12B and emission face 12B, some light escapes out of the guide plate 12. Leaking from the back face 12B provides light which is reflected and scattered by the reflection sheet 14 and is returned into the guide plate 12. This checks energy loss.

The emission face 12C provides a light control face having a function to promote emission, thereby promoting emission from the emission face 12C. Relations between a reflection-scattering effect by the reflection sheet 14 and an emission promotion function of the light control face are described later.

The emission face 12C emits light to forward inclined directions (directions of the distal wedge-end) because of the aforesaid directivity. This inclined directivity is modified by the prism sheet 15 before the light is supplied to the liquid crystal display panel LP.

The prism sheet 15 has a prism face which functions as a light control face. And the prism sheet 15 is orientated so that the prism face is directed to the emission face 12C. As shown by a circled and partially enlarged illustration with arrow S in FIG. 2, the prism face includes a great number of projection rows. Each projection row has a pair of slopes 15A, 15B which run in parallel with the incidence face 12A. In this embodiment, a pair of slopes 15A, 15B are connected directly to each other, giving a triangular cross section to each projection row. A preferable repetition pitch of the projection rows is 30 μm.

Illumination light L emitted from the emission face 12C is introduced into the prism sheet 15 through slopes 15B, being reflected by slopes 15A to be outputted toward a frontal direction with respect to the emission face (upward in FIG. 2). Thus the prism sheet 15 corrects directivity of emission to the frontal direction with respect to the emission face regarding in a plane perpendicular to the incidence face 12A.

In this embodiment, each pair of slopes 15A, 15B have an equal inclination angle with respect to the emission face 12C. Prismatic vertical angle may fall within a range from 30 to 70 degrees. Cross section may have various symmetric or asymmetric shapes depending on characteristics required.

Meanwhile, referring to a circled and partially enlarged illustration with arrow B, the back face 12B of the guide plate 12 also includes a great number of fine projection rows. They run approximately at right angle with the incidence face 12A. Each projection row has a pair of slopes 12E, 12F which run approximately at right angle with the incidence face 12A. In this embodiment, a pair of slopes 12E, 12F are connected directly to each other, giving a triangular cross section to each projection row. These projection rows correct directivity of emission to the frontal direction (i.e. the normal direction) with respect to the emission face 12C regarding in a plane parallel with the incidence face 12A.

It should be noted that some of the inner incident light to the back face 12B impinges upon a slope 12F (or 12E) at a small incidence angle and once escapes out of the guide plate 12 through the slope 12F (or 12E). However, such escaping light is directed again into the guide plate 12 through a slope 12E (or 12F) of another projection row, being directed to the emission face 12C after reflection at a slope 12F or 12E of the same projection.

Such illumination light impinges upon the emission face 12C at small inner incidence angles, going out of the emission face 12C easily. Although some component returns into the guide plate 12 after being reflected by the reflection sheet 14, such component is also directed to the emission face 12C.

In this embodiment, each pair of slopes 12E, 12F have an equal inclination angle with respect to the emission face 12C, providing a prismatic vertical angle of 100 degrees. In general, prismatic vertical angles falling within a range from 50 to 130 degrees are practical. Cross section of projection row may have various symmetric or asymmetric shapes depending on characteristics required.

Figure 4:
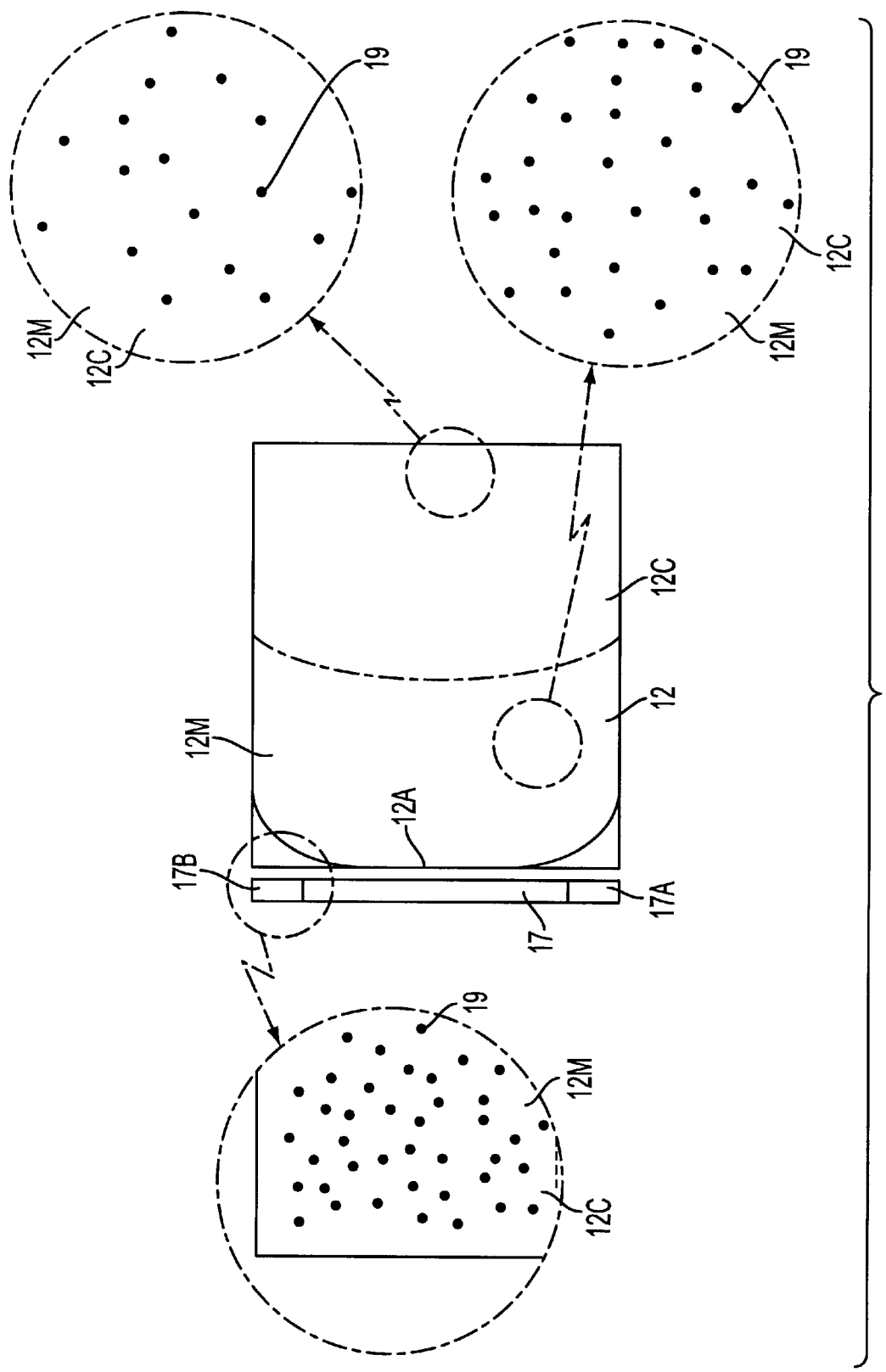
FIG. 4 is a plan view with a partial enlarged view to illustrate a light control face provided by the emission face of the guide plate employed in the first embodiment.

Next, referring to FIG. 4, a light control face 12M provided by the emission face 12C is exemplarily shown. The light control face 12M is provided with a great number of light scattering elements 19. Each light scattering element 19 is a locally formed dot-like rough region, for formation of which technique such as mat-processing or molding with an etched mold is applied.

Dot size is preferably small enough to be almost invisible when observation from above the emission face 12C is carried out. This requires practically dot size to be not greater than about 80 μm, preferably not greater than 50 μm.

Dot-radius not greater than 25 μm will further reduce visibility. In this embodiment, dot size is about 35 μm. Each dot has a contour like a projection, for example, of 25 μm.

The light scattering elements 19 distributes according to a certain pattern. This pattern is designed depending on degree of demand for emission promotion. High covering rates are imparted to areas of great demand, in other words, to areas where emission intensity tends to be reduced, in order that emission intensity reduction is avoided.

Covering rate can be defined as occupation area of light scattering elements 19 per unit area. If the light scattering elements 19 are of a size, covering rate can be also defined as number of light scattering elements 19 per unit area.

In a part occupied by no light scattering element 19, quantity of emission from the portion depends on quantity of light such that inner incidence angle to the portion is smaller than the critical angle. On the other hand, in the other part occupied by light scattering elements 19, quantity of emission is relatively large because of being free from such critical angle condition. That is, emission is promoted.

Macroscopically, in general, high covering rate brings strong emission promotion function. Therefore, the light scattering pattern is designed so that high covering rates are imparted to portions which would run short of emission if light scattering element 19 is not formed, while low covering rates are imparted to portions where emission intensity would be enough without light scattering element 19.

Figure 1A:
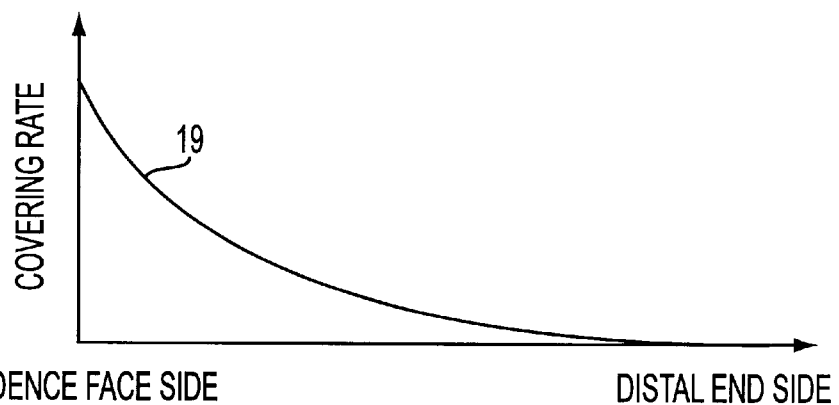
FIG. 1a is a graph showing variation of covering rate of scattering elements on an emitting face (light control face) of a guide plate employed in a first embodiment.

In an example shown in FIG. 4 including three pieces of circled partially enlarged illustration, scattering pattern is formed so that covering rate is falling as distance from the incidence face 12A is increasing, as depicted in FIG. 1a. And light scattering elements are arranged so that covering rate is increasing toward corner portions located at both ends of the incidence face 12A. This prevents short of emission intensity which could be caused corresponding to both ends 17A, 17B of the fluorescent lamp 17.

In such ways, the light control face 12M uniformalizes emission intensity of the emission face 12C. However, attention should be paid to a problem. That is, emission intensity uniformalization based on degree of scattering power involves influence on angular characteristics of the emission intensity of the emission face 12C without fail. If the emission face 12C is provided with a covering rate variation as shown in FIG. 1a, emission occurs in many directions around the incidence face 12A while directivity is maintained more positively according to an increasing distance from there, as shown by sets of arrows in FIG. 1b.

As a result, brightness variation depending on viewing angles is small around the incidence face 12A while brightness variation depending on viewing angles rises at locations far from the incidence face 12A. This leads to bright-dark unevenness. That is, provided that design succeeds in uniformalizing brightness regarding observation from the frontal direction, undesirable bright-dark unevenness will appear when observation is carried out with an angular deviation from the frontal direction by some not large degrees, for example, about 10 or 20 degrees.

According to the present invention, such bright-dark unevenness is reduced by means of uneven scattering power imparted to the inner face (reflection surface) of the reflection sheet 14.

The inner face of the reflection sheet 14 includes a plurality of fine regions provided with scattering property which is differs from that of the rest region of the reflection face. Degree of angular extension of output light from the emission face is controlled through this feature, thereby enabling the above-described bright-dark unevenness to be reduced.

The reflection sheet 14 is a sheet member with irregular reflectivity such as white PET sheet, being provided with a plurality of fine regions on the inner face. Dot-like grey ink print is applied to the sheet surface with irregular reflectivity to form the fine regions. The grey ink is reduces scattering power. As a result, the fine regions has a smaller scattering power in comparison with that of the rest region.

Covering rate of the fine regions can be defined in the same way just like that of the above-mentioned light scattering elements 14. That is, covering rate can be defined as occupation area of fine regions per unit area. If the fine regions are of a size, covering rate can be also defined as number of fine regions per unit area. In the present embodiment, covering rate of the fine regions varies so as to tend to be falling with increasing distance from the incidence face 12A, as shown in FIG. 1d.

Figure 1B:
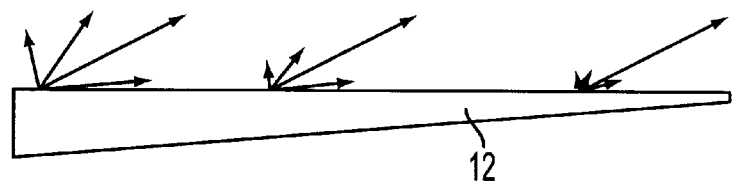
Figure 1C:
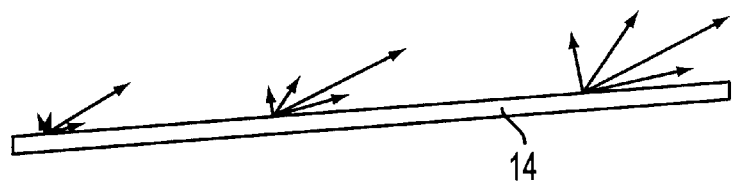
FIG. 1c is a diagram illustrating directional characteristics of scattering-reflection varying corresponding to FIG. 1d.
Figure 1D:
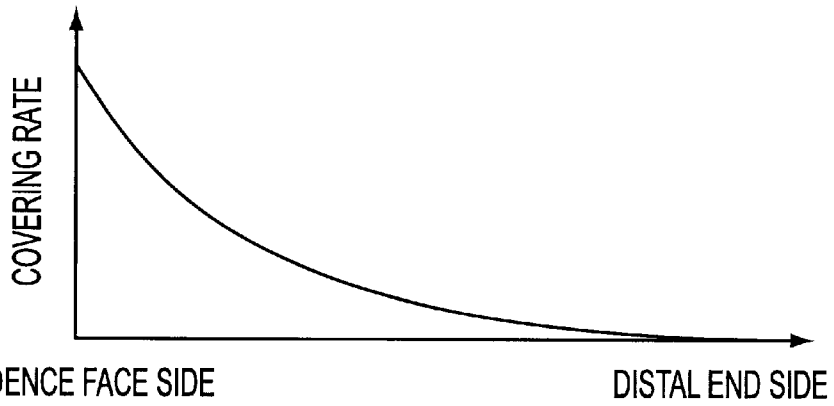
FIG. 1d is a graph showing variation of covering rate of fine regions on a reflection surface (inner face) of a reflection member employed in the first embodiment.

As a result, if the inner face of the reflection face 14 is provided with a covering rate variation as shown in FIG. 1d, less scattering occurs around the incidence face 12A while scattering occurs more positively according to an increasing distance from there, as shown by sets of arrows in FIG. 1d. The sets of arrows in FIG. 1d illustrate the state of scattering.

Leaking light from the back face 12B is directly subject to such effect. It should be noted that degree of scattering involved in reflection at the reflection face is then taken over by emission from the emission face 12C. That is, angular extension of emission from the emission face 12C is reduced around the incidence face 12A and increases according to distance from there. This functions so as to compensate effect of the light control face shown in FIG. 1b. As a result, angular extension of emission is flattened, thereby preventing the above-described bright-dark unevenness from appearing.

Such action of bright-dark unevenness elimination is further described below with referring to FIGS. 5 through 10 illustrating graphed measurement results. In each graph, abscissa indicates angle of measurement direction regarding in a plane perpendicular to the incidence face 12A, with 0 degree indicating a frontal direction. And, directions inclined to the distal wedge-end are expressed by plus (+) angles while directions inclined to the incidence face are expressed by minus (−) angles.

Ordinate indicates scored intensity of light (brightness). In each figure, measurement gives curve LA showing emission intensity variation at a portion having the highest covering rate of light scattering elements 14 and curve LC showing emission intensity variation at a portion having the lowest covering rate of light scattering elements 14. And curve LB shows emission intensity variation at a portion having the intermediate covering rate of light scattering elements 14.

Figure 5:
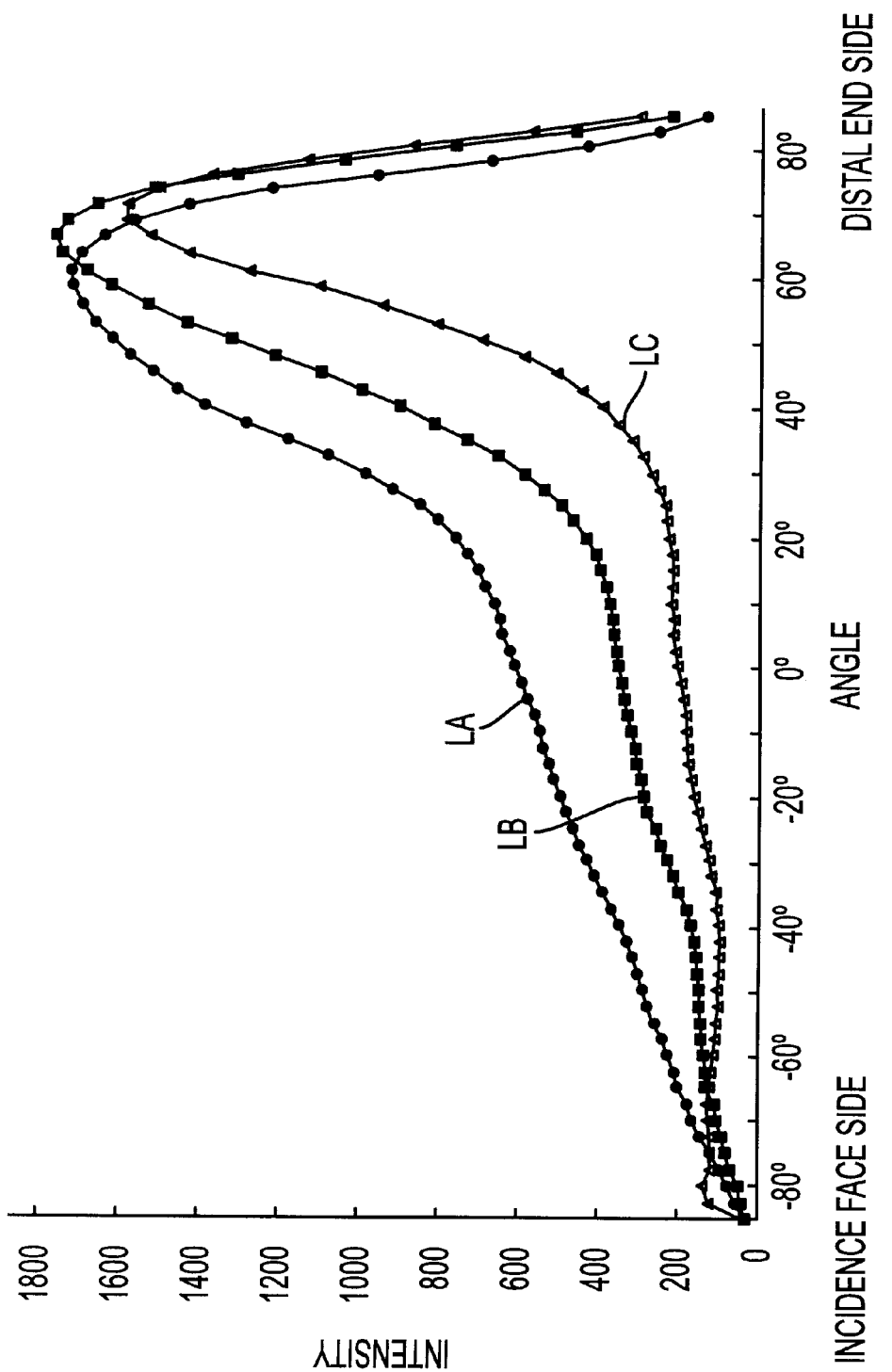
FIG. 5 is a graph with plotting of angular characteristics of emission intensity outputted from an emission face of a guide plate under a condition such that a reflection member to which no processing is applied.
Figure 6:
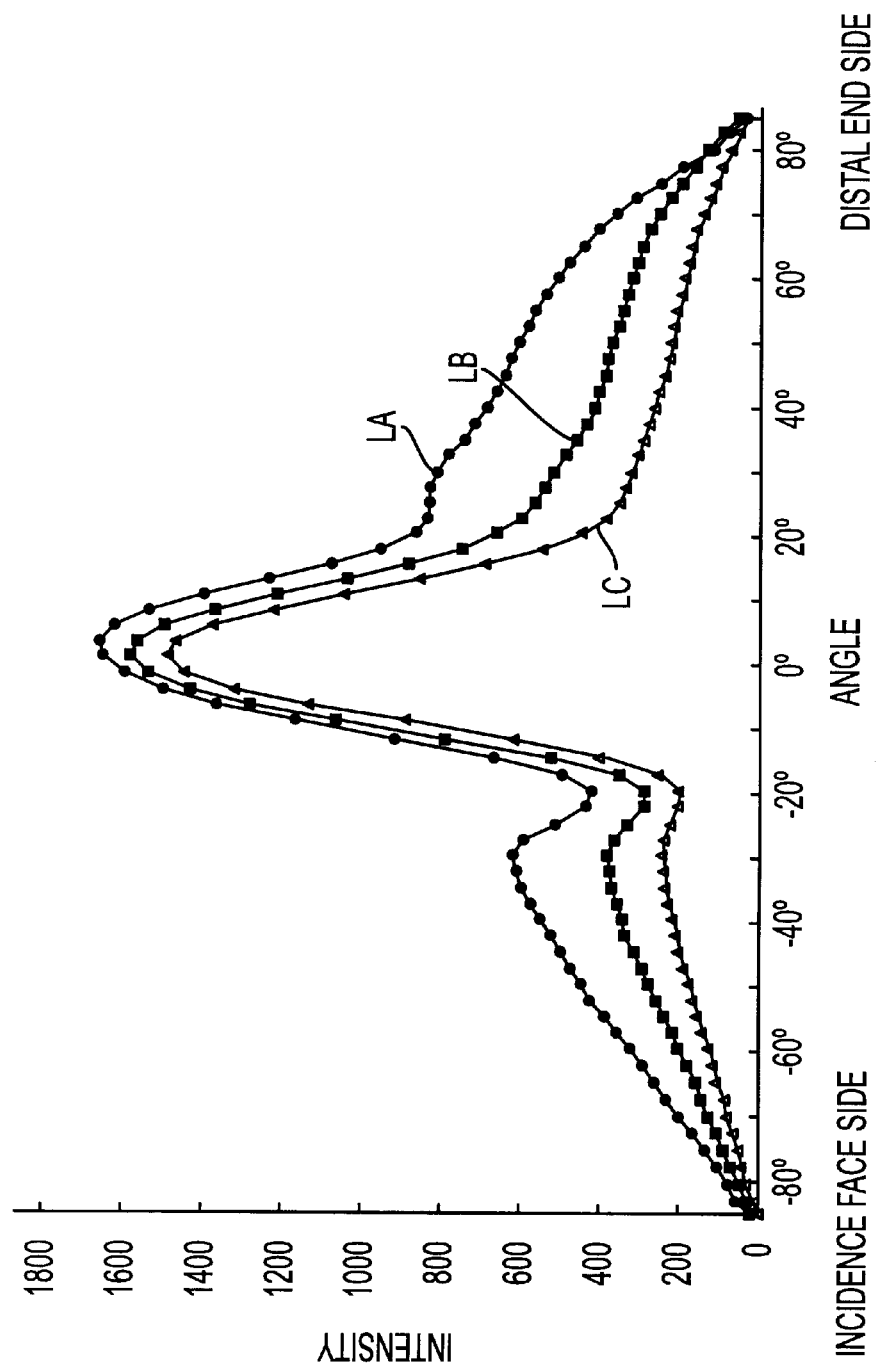
FIG. 6 is a graph with plotting of angular characteristics of emission intensity outputted from a prism sheet under a condition such that a reflection member to which no processing is applied.

First, FIGS. 5 and 6 illustrate angular characteristics respectively in cases where a non-processed reflection member is employed. Plotting of FIG. 5 shows angular characteristics of output intensity from the emission face while that of FIG. 6 shows angular characteristics of output intensity from the prism sheet 15. The followings are understood from FIGS. 5 and 6.

(1) In both of FIGS. 5 and 6, profile becomes sharper in order of LA→LB→LC. There are striking profile differences among LA, LB and LC. In particular, curves LA, LB and LC differ greatly one another in ranges between +20 degrees and +60 degrees and between −20 degrees and −60 degrees in FIG. 6. This corresponds to the characteristics shown in FIG. 1b, providing a principal factor which brings the aforementioned bright-dark unevenness.

(2) In FIG. 5, angular peak position becomes greater in order of LA→LB→LC. Peak difference between LA and LC is about 15 degrees. This difference is reduced in FIG. 6 and peak positions of LA, LB and LC are roughly the same (frontal direction). This demonstrates well-known directivity modifying function of the prism sheet 15.

(3) In FIG. 5, peak height falls in order of LB→LA→LC. On the other hand, peak height falls in order of LA→LB→LC.

Figure 7:
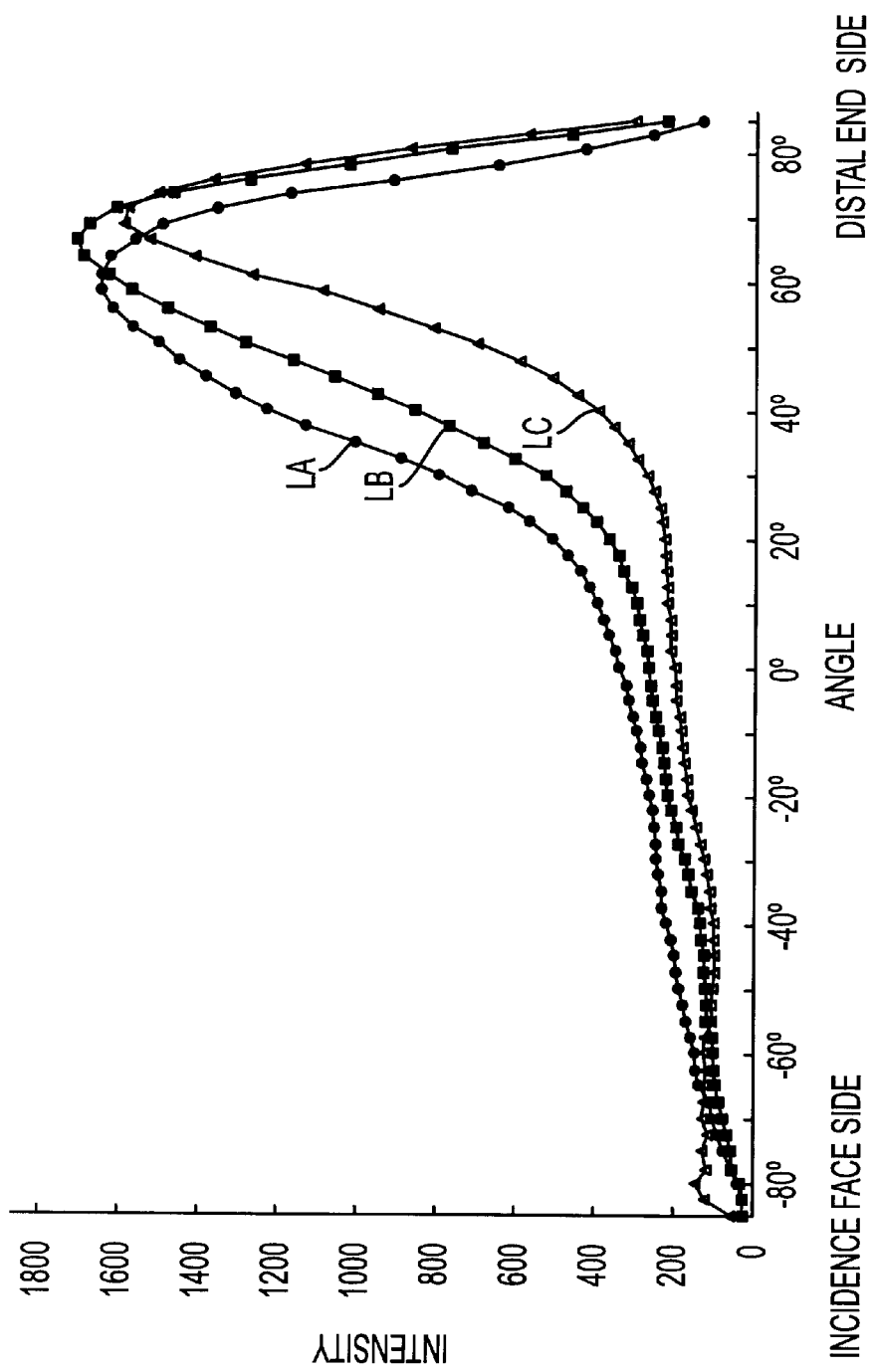
FIG. 7 is a graph with plotting of angular characteristics of emission intensity outputted from the emission face of the guide plate under the arrangement of the first embodiment.
Figure 8:
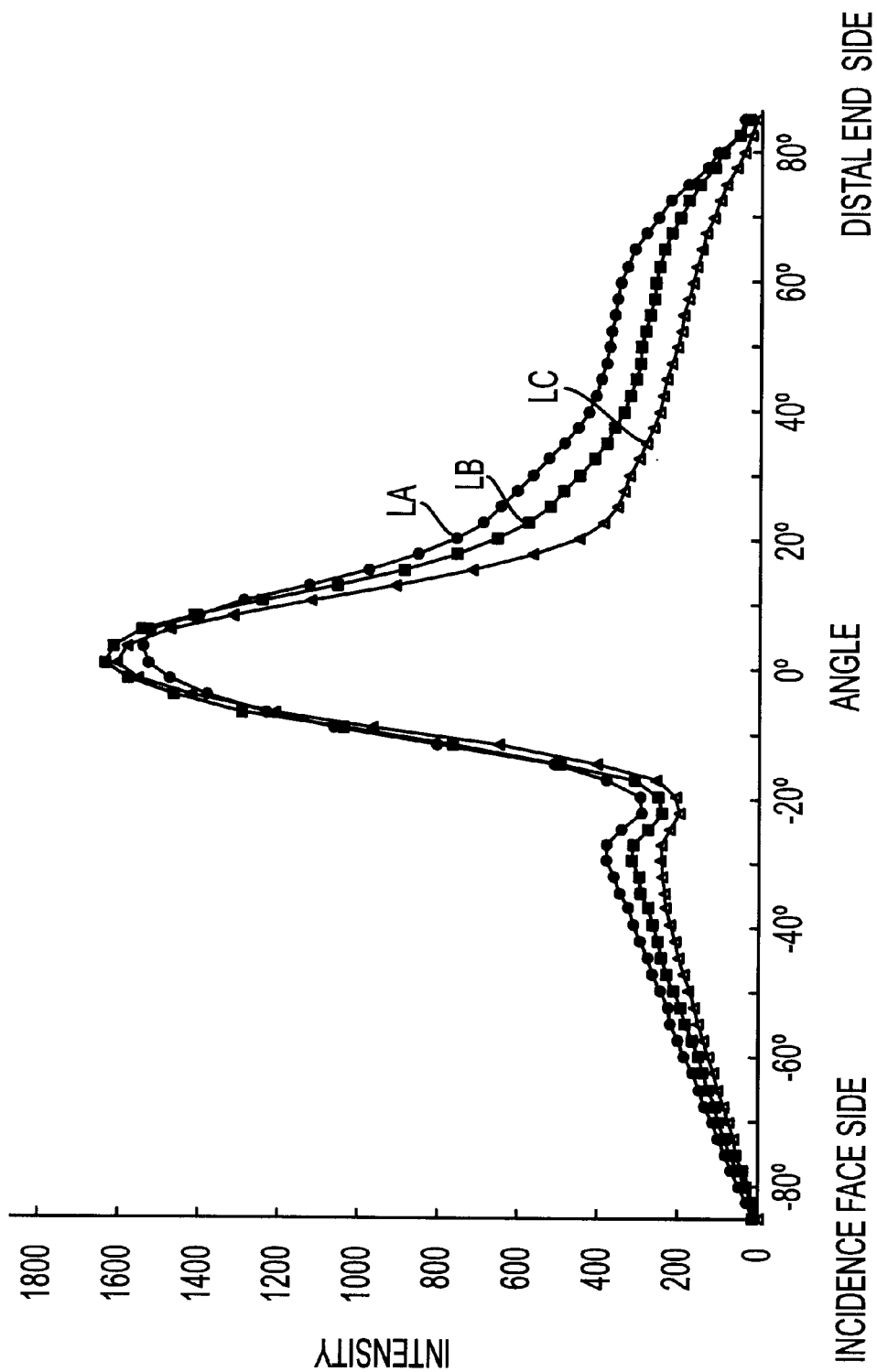
FIG. 8 is a graph with plotting of angular characteristics of emission intensity outputted from the prism sheet under the arrangement of the first embodiment.

Next, FIGS. 7 and 8 illustrate angular characteristics respectively in the case of the first embodiment which employs the reflection member shown in FIGS. 1c and 1d. Plotting of FIG. 7 shows angular characteristics of output intensity from the emission face while that of FIG. 8 shows angular characteristics of output intensity from the prism sheet 15. Comparing FIG. 7 with FIG. 5, and FIG. 8 with FIG. 6, the followings are understood.

(1) In both of FIGS. 7 and 8, profile become sharper in order of LA→LB→LC. Profile differences among LA, LB and LC are reduced in comparison with FIG. 5 or FIG. 6. In particular, differences among curves LA, LB and LC are almost eliminated in ranges between +20 degrees and +60 degrees and between −20 degrees and −60 degrees in FIG. 8. This tells that characteristics as shown in FIG. 1b are neutralized by characteristics as shown in FIG. 1c. Thus the above principal factor which brings bright-dark unevenness is removed.

(2) In FIG. 7, angular peak position becomes greater in order of LA→LB→LC. So far as this concerned, there is no great difference compared with FIG. 5. Further referring to FIG. 7, Peak difference between LA and LC is somewhat reduced compared with that shown in FIG. 5. Referring to FIG. 8, peak positions of LA, LB and LC are roughly the same (frontal direction). This demonstrates well-known directivity modifying function of the prism sheet 15.

(3) In FIG. 7, peak height falls in order of LB→LA→LC. So far as this concerned, there is no great difference compared with FIG. 5. On the other hand, FIG. 8 shows that peak height falls in order of LB→LC→LA, with differences among them being very small. In other words, peak brightness is uniformized in comparison with FIG. 6.

Figure 9:
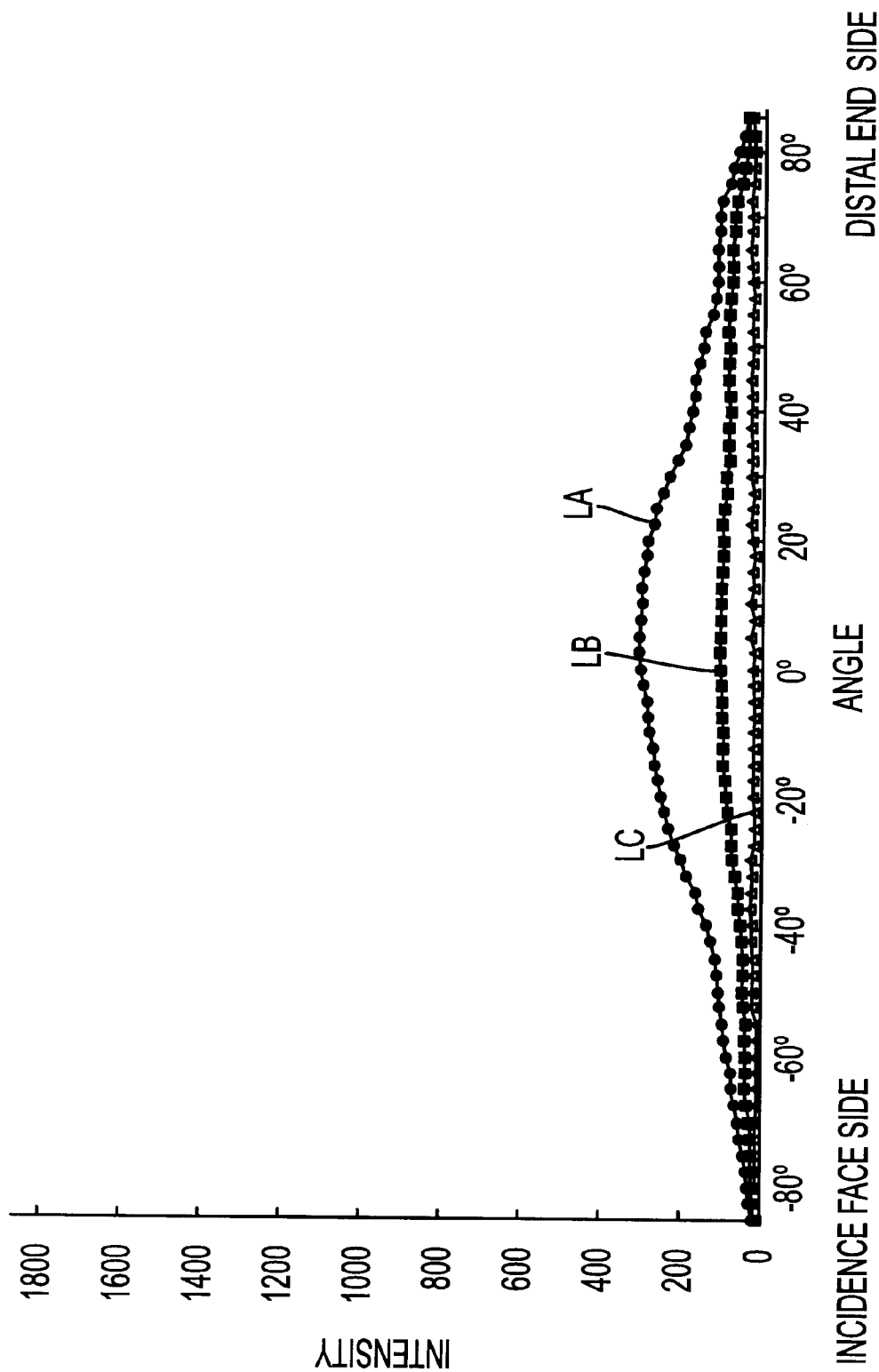
FIG. 9 is a graph to illustrate effects (changing of light output from an emission face of a guide plate) brought by forming of fine regions to a reflection surface of a reflection member.
Figure 10:
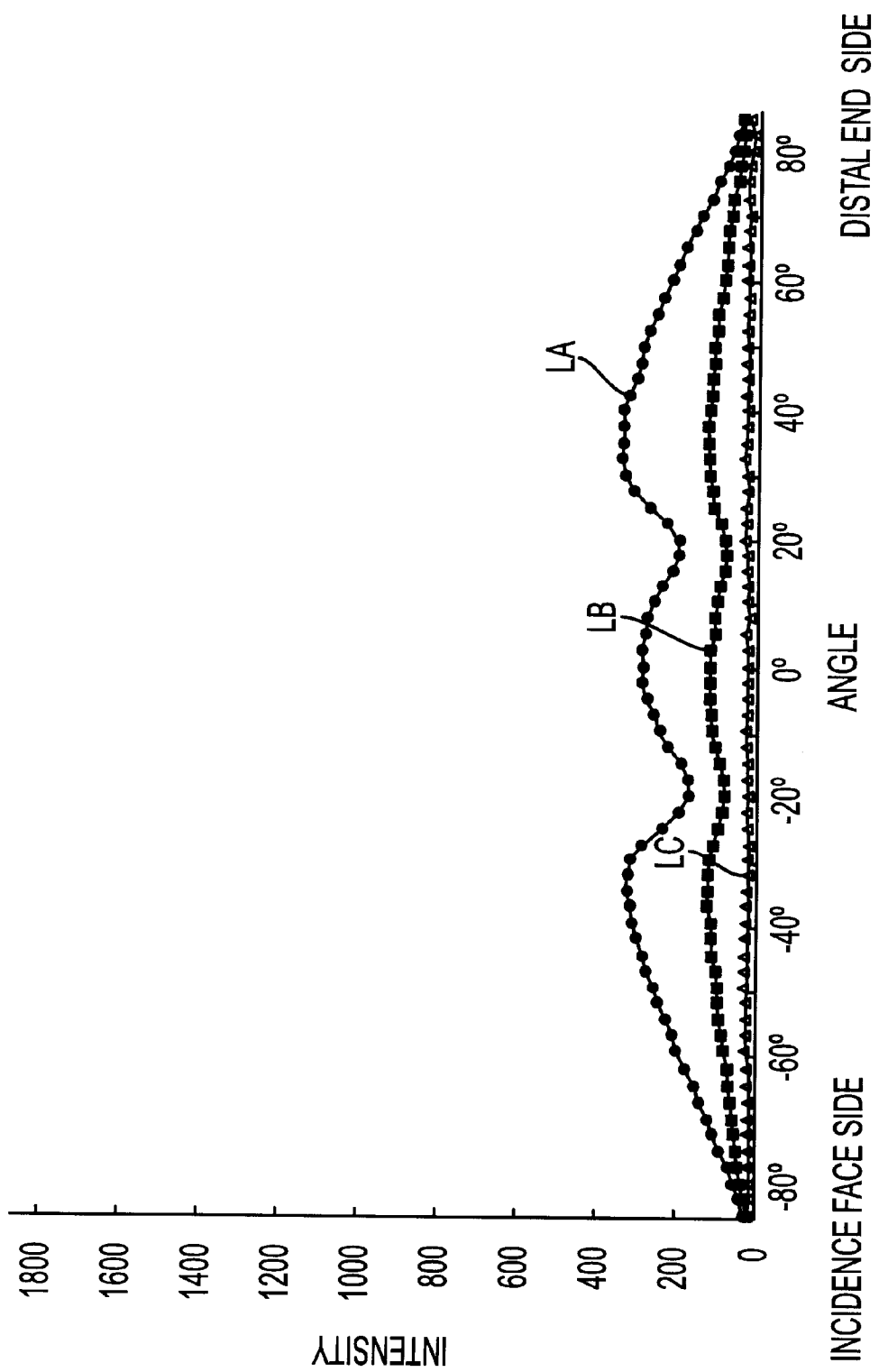
FIG. 10 is a graph to illustrate effects (changing of light output from a prism sheet) brought by forming of fine regions to a reflection surface of a reflection member.

Effects brought by employment of the reflection sheet 15 is further illustrated in FIG. 9, which gives a graphed difference between FIG. 5 and FIG. 7 (FIG. 5–FIG. 7), and in FIG. 10, which gives a graphed difference between FIG. 6 and FIG. 8 (FIG. 6–FIG. 8). The followings are understood from FIGS. 9 and 10.

(1) In FIGS. 9 and 10, change brought by the fine regions of the reflection sheet 14 becomes greater in order of LA→LB→LC. In particular, change of LA is greater compared with those of LB and LC at the frontal direction.

In FIG. 10, change of LA is greater compared with those of LB and LC over a large angular range.

(3) It is understood from the above items (1) and (2) that the fine regions of the reflection sheet 14 have a strong influence on LA. In other words, offset is strikingly effected between the maximum scattering power portion of the light control face and the minimum scattering power portion of the reflection sheet 14 (please see FIGS. 1a through 1d), thereby reducing bright-dark unevenness successfully.

<Second Embodiment>

Figure 11:
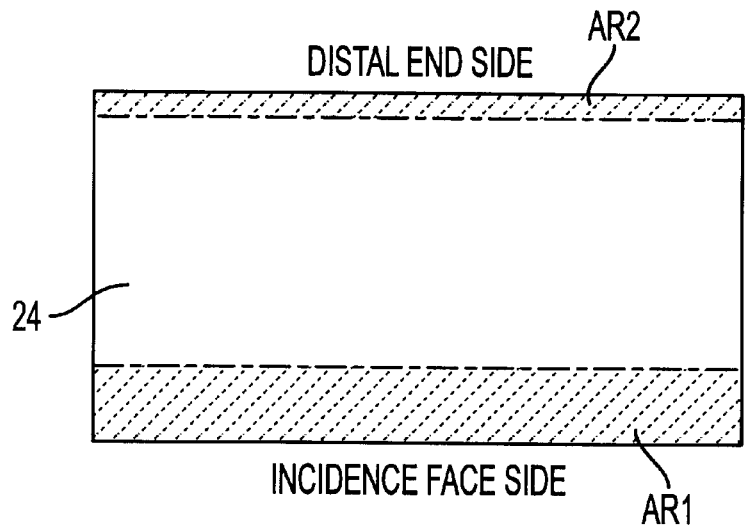
FIG. 11 is a plan view of a reflection member (reflection sheet) employed in a second embodiment.

The second embodiment employs a reflection sheet 24 as shown in FIG. 11 instead of the reflection sheet 14. Members other than the reflection sheet 24 and their functions are fundamentally the same as those of the first embodiment. Accordingly, repeated description on them is omitted. The reflection sheet 24 is a sheet member with irregular reflectivity such as white PET sheet. It has a reflection face including partial areas AR1 and AR2 in which a plurality of fine regions are formed. Dot-like grey ink print is applied to the sheet surface with irregular reflectivity to form the fine regions. The grey ink is reduces scattering power. As a result, the fine regions has a smaller scattering power in comparison with that of the rest region.

The partial area AR1 is a band-like area extending along the incidence face 12A of the guide plate 12. As discussed previously (please see FIGS. 1a and 1b), around the incidence face 12A, the emission face is provided with a great scattering power, with the result that angular extension of illumination output is apt to be larger than that of the other area.

Fine regions formed within the partial area AR1 work so that the above angular extension is restricted. Such restriction of angular extension is not done in a portion without fine region formation between AR1 and AR2.

On the other hand, the partial area AR2 is a band-like area extending along the distal wedge-end of the guide plate 12. This portion around the distal wedge-end is involved in a special situation. That is, inner propagation light is inside-reflected and much of inside-reflected light tends to be emitted toward various directions from the vicinity of the distal wedge-end. This causes the vicinity of the distal wedge-end to have a local excessive emission with a remarkably large angular extension.

Fine regions formed within the partial area AR2 work so that the above excessive emission is restricted. Thus the present embodiment reduces bright-dark unevenness over the whole emission face through a control effect working around the incidence face and distal wedge-end. Covering rate of fine regions may be constant within each of the partial areas AR1 and AR2.

<Third Embodiment>

Figure 12:
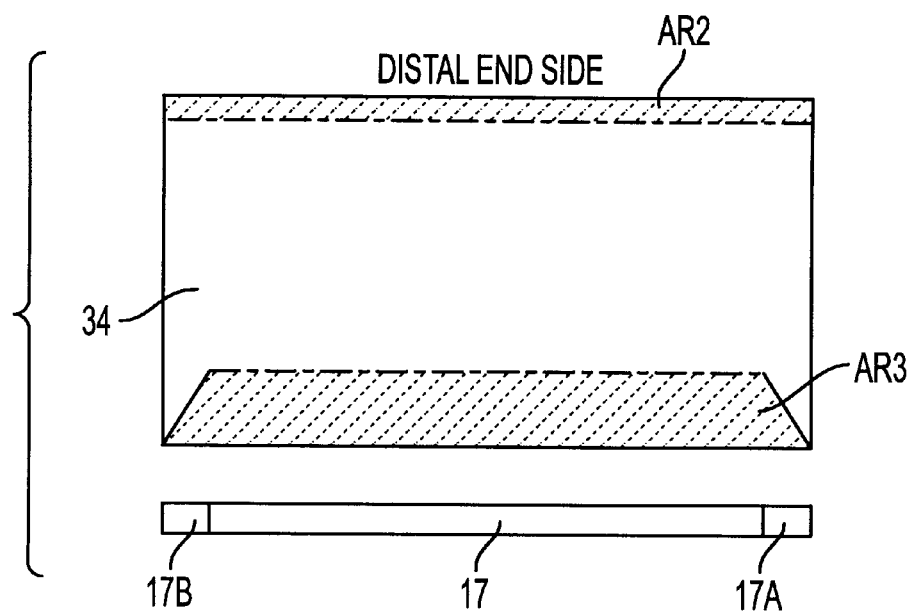
FIG. 12 is a plan view of a reflection member (reflection sheet) employed in a third embodiment.

The third embodiment employs a reflection sheet 34 as shown in FIG. 12 instead of the reflection sheets 14, 24. Members other than the reflection sheet 34 and their functions are fundamentally the same as those of the first embodiment. Accordingly, repeated description on them is omitted.

The reflection sheet 34 is a sheet member with irregular reflectivity such as white PET sheet. It has a reflection face including partial areas AR3 and AR4 in which a plurality of fine regions are formed. Dot-like grey ink print is applied to the sheet surface with irregular reflectivity to form the fine regions. The grey ink is reduces scattering power. As a result, the fine regions has a smaller scattering power in comparison with that of the rest region.

The partial area AR3 is a trapezoid-like area extending along the incidence face 12A of the guide plate 12. As discussed previously (please see FIGS. 1a and 1b), around the incidence face 12A, the emission face is provided with a great scattering power, with the result that angular extension of illumination output is apt to be larger than that of the other area. However, attention should be paid to a special situation that a local illumination output reduction tends to be caused at both corner portions located corresponding to the electrodes 17A and 17B of the fluorescent lamp 17.

Fine regions formed within the partial area AR3 work so that angular extension around the incidence face 12A is restricted under consideration of the above special situation. Accordingly, both corner portions correspond to both end portions of the trapezoid-like partial area AR3, where area width is made small to limit scattering power reduction effect of fine regions. Such restriction of angular extension is not done in a portion without fine region formation between AR3 and AR4.

The partial area AR4 is a band-like area like the partial area AR4 (in the second embodiment) extending along the distal wedge-end of the guide plate 12. Fine regions formed within the partial area AR4 work fundamentally in the same manner as that of fine regions formed within the partial area AR2. As mentioned above, this area is involved in a special situation. That is, inner propagation light is inside-reflected around the distal wedge-end, tending to produce a local excessive emission with a remarkably large angular extension.

Fine regions formed within the partial area AR4 work so that the above excessive emission is restricted. Thus the present embodiment reduces bright-dark unevenness over the whole emission face through controlling angular extension of illumination output around the incidence face and distal wedge-end of the guide plate under consideration of the special situation at both corner portions at both end of the incidence face. Covering rate of fine regions may be constant within each of the partial areas AR3 and AR4.

<Other Embodiments>

None of the above embodiments aim to be limitative for the scope of the present invention. For instance, the following modifications are allowed.

(1) In the above embodiments, fine regions are formed by applying grey ink print to faces of white PET sheets with irregular reflectivity. However, otherwise embodied various reflection members, their reflection faces and fine regions may be employed as follows.

(i) Print of white ink, black ink or transparent paint is applied, instead of grey ink, to sheet surface with irregular reflectivity, thereby forming fine regions having a reduced scattering power. Methods of fixing ink or paint to the reflection sheet face may be optional. For instance, ink drips may be sputtered onto the reflection sheet face to be fixed thereto.

(ii) A reflection member having a reflection face with regular reflectivity such as silver-evaporation-deposited reflection face instead of sheets with irregular reflectivity. Such reflection face with regular reflectivity has substantially no scattering power. On the other hand, fine regions has substantial scattering power.

Such fine regions may be formed, for example, through deposition or application of paint containing a component provided with scattering power such as silica. Alternatively, fine regions may be formed by roughening partially applied to the regularly reflective face.

In cases where fine regions have greater scattering power compared with the rest region, the fine regions work so as to enlarge angular extension of illumination output. Therefore, covering rate is designed according to a reversed distribution in comparison with that of the above-described embodiments.

For example, a covering rate variation falling with increasing distance from an incidence face as shown in FIG. 1d is replaced by another covering rate variation rising with increasing distance from the incidence face. Design of AR1, AR2, AR3 and AR4 shown in FIGS. 11 and 12 is modified so that they roughly correspond to "the rest regions" within which no fine region is formed. Regions between AR1 and AR2, and between AR3 and AR4 correspond resultantly to partial areas in which fine regions are formed.

(2) In the above embodiments, the emission faces of the guide plates provide light control faces which are provided with light scattering pattern (a great number of light scattering elements) formed by roughening. However, this puts no limitation on the scope of the present invention.

Light scattering pattern's elements may be formed by deposition of ink with light scattering property. Light scattering elements may be fine dome-like projections.

(3) In the above embodiments, the prism sheets are orientated so that their prism faces are directed to the guide plates, respectively. Orientation may be such that the prism faces are opposite with the guide plates, respectively.

(4) An additional sheet member other than a prism sheet may be disposed instead of or in addition to the prism sheet.

(5) In the above embodiments, the back faces of the guide plates provide prism faces, respectively. However, this puts no limitation on the scope of the present invention. Such prism faced may be omitted.

(6) In the above embodiments, the employed guide plates are scattering guide plates provided with light scattering power inside. However, this puts no limitation on the scope of the present invention. For example, a guide plate made of a transparent material having substantially no scattering power inside may be employed.

(7) A guide plate with a cross section other than wedge-shaped may be employed. For instance, a guide plate having uniform thickness is employable.

(8) A primary light source provided with an arrangement including a plurality of point-like light source elements such as LEDs may be employed. Light supply to a guide plate may be performed through a plurality of end faces (minor faces).

(9) The present invention may be applied to surface light source devices of side light type employed for uses other than backlighting of LCD. For instance, applications to surface light source devices of side light type incorporated with various illumination devices or display devices are broadly allowed.

What is claimed is:

1. A surface light source device of side light type comprising:

a guide plate having an emission face, a back face and an incidence face, said emission face being provided with a plurality of light scattering elements promoting emission from the emission face, the light scattering elements being distributed on the emission face with a covering rate varying depending on a position on the emission face;

a primary light source arranged to supply said guide plate with primary light through said incidence face; and a reflection member arranged along said back face so as to return light leaked from said back face into said guide plate, wherein said reflection member has a reflection face which is directed to said back face and is provided with a plurality of fine regions having a scattering property which is different from that of a rest of the reflection face to control angular extension of illumination output, the fine regions being arranged so as to prevent the light scattering elements being distributed on the emission face from causing an angular extension of illumination output to vary depending on a position on the emission face.

2. A surface light source device of side light type according to claim 1, wherein a light control member is disposed along said emission face to control directivity of output light from the emission face.

3. A surface light source device of side light type according to claim 1 or 2, wherein said back face is provided with a great number of projections running in a direction approximately perpendicular to said incidence face, thereby gathering output light from the emission face around a frontal direction regarding in a plane parallel with the incidence face.

4. A surface light source device of side light type according to claim 1 or 2, wherein said fine regions are provided by applying a material to an irregularly reflective surface, the material being capable of weakening scattering power of the irregularly reflective surface while the rest region is provided by an area excluding the fine regions from said irregularly reflective surface.

5. A surface light source device of side light type according to claim 3, wherein said fine regions are provided by applying a material to an irregularly reflective surface, the material being capable of weakening scattering power of the irregularly reflective surface while the rest region is provided by an area excluding the fine regions from said irregularly reflective surface.

6. A liquid crystal display including a liquid crystal display panel and a surface light source device of side light type for illuminating the liquid crystal display panel, the surface light source device comprising:

a guide plate having an emission face, a back face and ain incidence face, said emission face being provided with a plurality of light scattering elements promoting emission from the emission face, the light scattering elements being distributed on the emission face with a covering rate varying depending on a position on the emission face;

a primary light source arranged to supply said guide plate with primary light through said incidence face; and a reflection member arranged along said back face so as to return light leaked from said back face into said guide plate;

wherein said reflection member has a reflection face which is directed to said back face and is provided with a plurality of fine regions having a scattering property which is different from that of a rest of the reflection face to control angular extension of illumination output, the fine regions being arranged so as to prevent the light scattering elements being distributed on the emission face from causing an angular extension of illumination output to vary depending on a position on the emission face.

7. A liquid crystal display according to claim 6, wherein a light control member is disposed along said emission face to control directivity of output light from the emission face.

8. A liquid crystal display according to claim 6 or 7, wherein said back face is provided with a great number of projections running in a direction approximately perpendicular to said incidence face, thereby gathering output light from the emission face around a frontal direction regarding in a plane parallel with the incidence face.

9. A liquid crystal display according to claim 6 or 7, wherein said fine regions are provided by applying a material to an irregularly reflective surface, the material being capable of weakening scattering power of the irregularly reflective surface while the rest region is provided by an area excluding the fine regions from said irregularly reflective surface.

10. A liquid crystal display according to claim 8, wherein said fine regions are provided by applying a material to an irregularly reflective surface, the material being capable of weakening scattering power of the irregularly reflective surface while the rest region is provided by an area excluding the fine regions from said irregularly reflective surface.

* * * * *